UNITED STATES PATENT OFFICE.

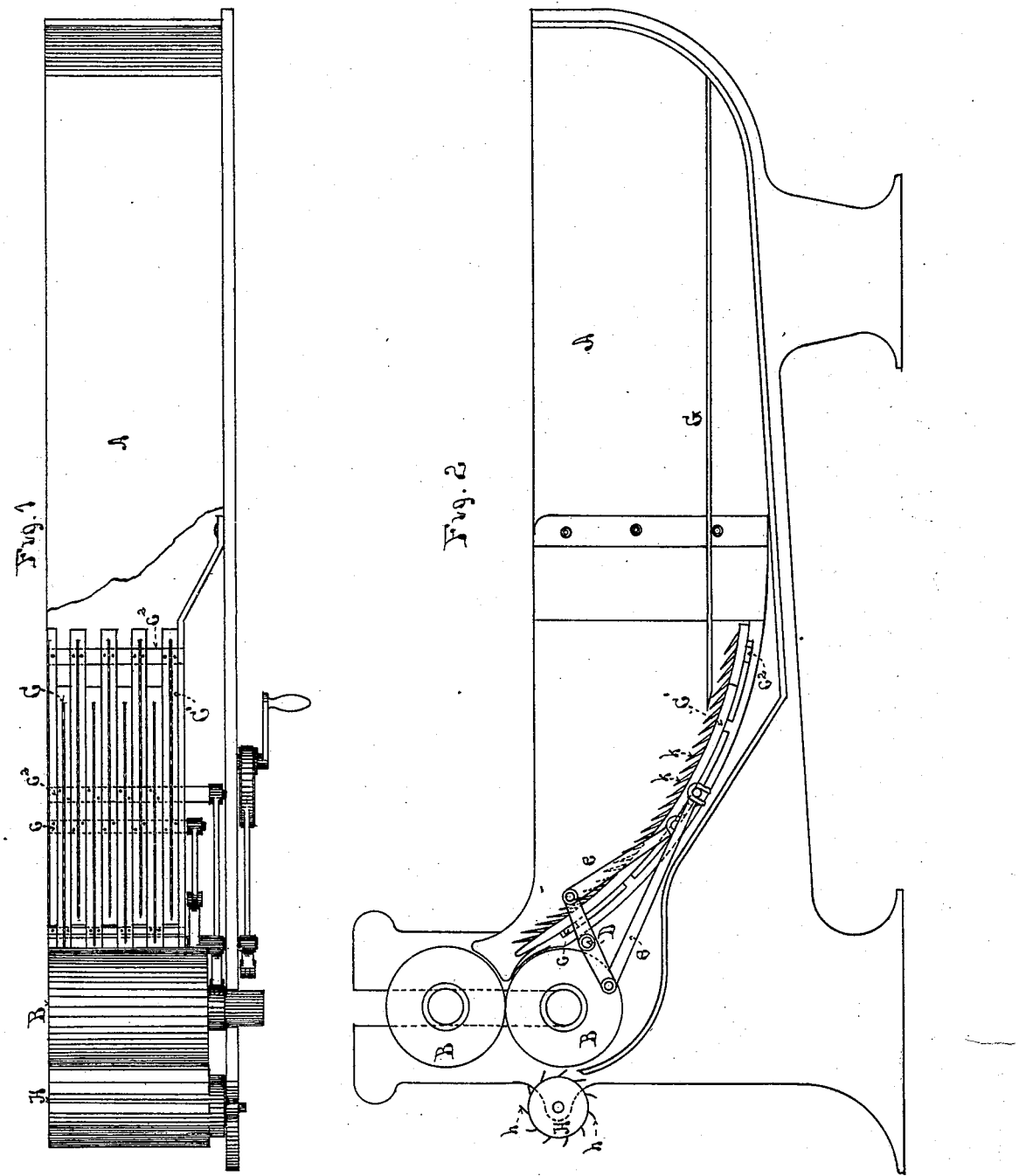

FREDERICK G. SARGENT AND ALLAN C. SARGENT, OF GRANITEVILLE, MASS.

WOOL-WASHING MACHINE.

SPECIFICATION forming part of Letters Patent No. 260,900, dated July 11, 1882.

Application filed January 9, 1882. (No model.)

*To all whom it may concern:*

Be it known that we, FREDERICK G. SARGENT and ALLAN C. SARGENT, of Graniteville, in the county of Middlesex and State of Massachusetts, have invented certain Improvements in Wool-Washing Machines, of which the following is a specification.

Our invention relates to machines in which the wool to be washed is placed in a bowl or tank containing a washing or scouring liquid, after being agitated or stirred, in which it is moved forward, by mechanism provided for that purpose, to squeeze-rolls, from which it is thrown off after having the water squeezed from it; and the objects of our invention are to provide a mechanism which will forward the wool continuously to the squeeze-rolls; to provide such a mechanism which will occupy but a small portion of the bowl, and which will freely enter under all wool which can be pushed forward by the rakes operating in the bowl, and to remove the wool from the squeeze-rolls after the fluid is squeezed from it. We accomplish these objects by the mechanism illustrated in the accompanying drawings, in which—

Figure 2 is a side view of a wool-washer with the side of the bowl next to the observer removed. Fig. 1 is a plan view of one-half the width of the machine.

A is the bowl into which the scouring-liquid is placed, and in which the wool is agitated and washed.

B B are the squeeze-rolls.

C C' are carrier-strips extending from the bottom of the bowl to near the nip of the squeeze-rolls. These strips are connected together by the bars $c\ c^2$ in sets, in which each alternate strip forms a part of one set, C, and the intermediate ones, C', the other, one set, C, being attached to the bars $c\ c$ and the other, C', to the bars $c^2\ c^2$. Each of these sets is free to move independent of the other, and each is connected to an arm on a rock-shaft, D, by the connecting-rod $e$. The arm connected with one set being placed opposite that connected with the other gives each set an opposite movement to that given to the other with each movement of the rock-shaft. The strips C C' are provided with teeth or spines $k\ k$, which project forward and upward from their top surfaces and catch into the wool as they are moved forward, but are withdrawn from it as they are moved downward and backward, and as each set is moved forward while the other is moved backward the wool is being constantly carried forward toward the squeeze-rolls. The strips C C' are formed in the arc of a circle nearly corresponding to that of the swinging rake, which oscillates and moves the wool in the liquid in the bowl. Therefore the bowl can be made much shorter than when the carrier-strips are made straight and placed in a sufficiently inclined position to grasp the heavily-saturated masses of wool which are partly or wholly submerged in the fluid as they are moved forward by the rake operating in the bowl in the usual well-known manner. The carrier-strips C C' extend down a sufficient distance to have their lower ends covered by the false bottom G, which is placed in the bowl in the usual manner, and as they are not given a sufficient movement to withdraw their ends from under the bottom all the wool which rests upon the bottom, as the rake moves it forward, will be brought into contact with the teeth of the carrier without coming into contact with the ends of the strips and being pushed back thereby.

H is a guard-cylinder provided with guards $h$, which scrape off any wool which may adhere to the squeeze-rolls in the well-known manner. The guards $h$ are given a backward inclination in order to prevent the guards from carrying the wool around with them, as they frequently do when placed radial upon the cylinder.

What we claim as new and of our invention is—

1. The combination of the bowl A, with the concavely-curved carrier-strips C C', adapted to move in the arc of a circle, substantially as described.

2. The combination of the bowl A and concavely-curved toothed carrying-strips C C', with the false bottom G, which overlaps the lower ends of the strips C C', substantially as described.

FREDERICK G. SARGENT.
ALLAN C. SARGENT.

Witnesses:
L. C. RICE,
N. P. OCKINGTON.